(12) United States Patent
 Wang

(10) Patent No.: US 11,267,060 B2
(45) Date of Patent: Mar. 8, 2022

(54) ELECTRICAL POTENTIAL MACHINING DEVICES AND METHODS

(71) Applicant: The Board Of Regents Of The Nevada System Of Higher Education On Behalf Of The University Of Nevada, Las Vegas, Las Vegas, NV (US)

(72) Inventor: Zhiyong Wang, Henderson, NV (US)

(73) Assignee: The Board of Regents of the Nevada System of Higher Education on Behalf of the University of Nevada, Las Vegas, Las Vegas, NV (US)

( * ) Notice: Subject to any disclaimer, the term of this patent is extended or adjusted under 35 U.S.C. 154(b) by 656 days.

(21) Appl. No.: 16/099,593

(22) PCT Filed: May 16, 2017

(86) PCT No.: PCT/US2017/032902
§ 371 (c)(1),
(2) Date: Nov. 7, 2018

(87) PCT Pub. No.: WO2017/201047
PCT Pub. Date: Nov. 23, 2017

(65) Prior Publication Data
US 2019/0126371 A1    May 2, 2019

Related U.S. Application Data

(60) Provisional application No. 62/338,034, filed on May 18, 2016.

(51) Int. Cl.
*B23H 5/04* (2006.01)
*B23H 5/06* (2006.01)
(Continued)

(52) U.S. Cl.
CPC ................ *B23H 5/04* (2013.01); *B23B 1/00* (2013.01); *B23H 5/06* (2013.01); *B23P 17/00* (2013.01);
(Continued)

(58) Field of Classification Search
CPC . B23B 1/00; B23B 2222/88; B23B 2226/275; B23H 5/04; B23H 5/06;
(Continued)

(56) References Cited

U.S. PATENT DOCUMENTS 4,424,433 A * 1/1984 Inoue ...................... B23H 7/38
                                                      204/222
7,198,043 B1 * 4/2007 Zhang ...................... B23B 1/00
                                                       125/39

(Continued)

FOREIGN PATENT DOCUMENTS

JP          2012110975 A  *  6/2012

*Primary Examiner* — Dana Ross
*Assistant Examiner* — Joe E Mills, Jr.
(74) *Attorney, Agent, or Firm* — Ballard Spahr LLP

(57) ABSTRACT

A device for machining a work piece creates an electrical potential between an electrode and the work piece or another conducting body proximate to the work piece. The electrical potential establishes an electrical field within the work piece that is expected to repel electrons and create a region of positively charged ions which repel one another. This region is expected to be weakened and material is expected to be removable from this region of the work piece using less force and energy than when machined by traditional machining techniques.

21 Claims, 5 Drawing Sheets

(51) Int. Cl.
*B23P 17/00* (2006.01)
*B23B 1/00* (2006.01)
*B23P 25/00* (2006.01)

(52) U.S. Cl.
CPC .......... *B23P 25/00* (2013.01); *B23B 2222/88* (2013.01); *B23B 2226/275* (2013.01)

(58) Field of Classification Search
CPC ... B23H 5/08; B23H 5/10; B23P 17/00; B23P 25/00
USPC .................................................. 219/137.71
See application file for complete search history.

(56) References Cited

U.S. PATENT DOCUMENTS

| | | | |
|---|---|---|---|
| 2002/0110502 A1* | 8/2002 | Yang | B23H 1/00 422/186.04 |
| 2009/0194512 A1* | 8/2009 | Kuo | B23H 7/38 219/69.17 |
| 2016/0346856 A1* | 12/2016 | Luo | B23H 7/26 |

* cited by examiner

ELECTRICAL POTENTIAL MACHINING DEVICES AND METHODS

CROSS-REFERENCE TO RELATED APPLICATIONS

The present application is a national phase filing under 35 U.S.C. § 371 of International Application No. PCT/US2017/032902, filed on May 16, 2017, which claims priority to and the benefit of the filing date of U.S. Provisional Patent Application No. 62/338,034, filed May 18, 2016, which application is incorporated herein by reference in its entirety.

FIELD OF THE INVENTION

This invention concerns devices and methods for machining materials.

BACKGROUND

Traditional machining of a work piece requires cutting tools which are harder and stronger than the material from which the work piece is made. However, when the work piece material is extremely hard, strong or brittle, or has a low thermal conductivity, there is a challenge associated with finding a tool material that is applicable for machining such difficult to machine materials. This is of great importance because industries are constantly increasing the use of harder and stronger materials to improve product performance. It has become difficult to find cutting tools which can meet this challenge and machine such materials efficiently.

For example, various characteristics of titanium alloys make them one of the most difficult materials to machine. Titanium alloys are well known for their high strength, high corrosion resistance, and high bio-compatibility. They are widely used in numerous applications, such as aeronautical structures, military vehicles, chemical and petrochemical equipment, surgical implants, sports equipment, and marine equipment. The strength of titanium alloys (about 1370 MPa) is much higher than steel alloys (about 550 MPa) and consequently they require significantly more cutting force and energy to machine. However, their thermal conductivities (around 6.7 W/mK) are much lower than steel alloys (about 51.9 W/mK). As a result, high thermal gradients are present at the tool-work piece interface during cutting, resulting in accelerated tool wear. Titanium alloys are also chemically reactive and have a tendency to weld to the tool at elevated temperatures during machining. This can cause tool chipping, premature tool failure, and poor surface finish on the work piece. It would be advantageous to provide a device for machining high strength, hard materials that does not suffer the disadvantages of prior art techniques.

SUMMARY

One example of the invention concerns a device for machining an electrically conducting work piece. In a particular example embodiment the device comprises an electrode positionable proximate to the work piece. A voltage source is electrically connected between the electrode and the work piece. The voltage source establishes an electrical potential difference between the electrode and the work piece sufficient to repel electrons in outer shell orbitals of atoms in a portion of the work piece proximate to the electrode. It is contemplated that the electrical potential difference can range from about 10 kilovolts to about 100 megavolts, about 10 kilovolts to about 100 kilovolts, and about 10 megavolts to about 100 megavolts. A tool is movable into contact with the portion of the work piece to separate the portion from the work piece. By way of specific example the tool comprises a gas jet impinging on the work piece. The electrode and the tool are movable relatively to the work piece. In another example embodiment the electrode comprises a needle. Other example embodiments of the electrode include a bar, a cone, a cylinder, a plate and combinations thereof.

In an example embodiment, a dielectric material is positioned between the electrode and the work piece. Further by way of example, the electrode comprises the tool, the electrode having a layer of dielectric material thereon.

A method for machining an electrically conducting work piece is also contemplated as part of the invention. One example method according to the invention comprises:
  positioning an electrode proximate to the workpiece;
  establishing an electrical potential difference between the electrode and the work piece sufficient to repel electrons in outer shell orbitals of atoms in a portion of the work piece proximate to the electrode; and separating the portion from the work piece.

The invention further encompasses a device for machining a non-conducting work piece. In one example embodiment the device comprises an electrode positionable proximate to the work piece. An electrically conducting member is positionable proximate to the work piece. A voltage source is electrically connected between the electrode and the electrically conducting member. The voltage source establishes an electrical potential difference between the electrode and the electrically conducting member sufficient to repel electrons in outer shell orbitals of atoms in a portion of the work piece between the electrically conducting member and the electrode. It is contemplated that the electrical potential difference can range from about 10 kilovolts to about 100 megavolts, about 10 kilovolts to about 100 kilovolts, and about 10 megavolts to about 100 megavolts. A tool is movable into contact with the portion of the work piece to separate the portion from the work piece. In a particular example the tool comprises a gas jet impinging on the work piece. The electrode and the tool are movable relatively to the work piece in an example embodiment. Further by way of example the electrode comprises a needle. Other example electrode embodiments include a bar, a cone, a cylinder, a plate and combinations thereof.

A further example embodiment comprises a dielectric material positioned between the electrode and the work piece. In a specific embodiment the electrode comprises the tool, the electrode having a layer of dielectric material thereon.

DETAILED DESCRIPTION

Figure 1A:
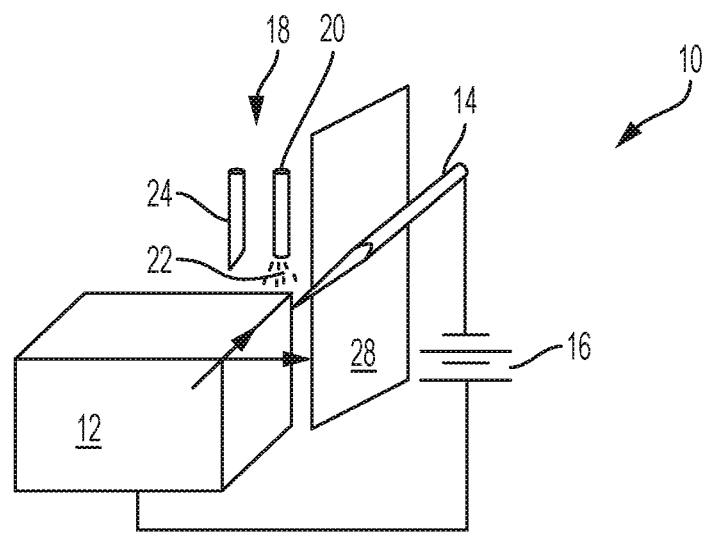
FIG. 1A is a schematic representation of an example embodiment of a device for machining an electrically conducting work piece according to the invention.

FIG. 1A shows a schematic representation of an example device 10 for machining an electrically conducting work piece, such as a metal work piece 12 according to the invention. Device 10 comprises an electrode 14 and a voltage source 16. Voltage source 16 is electrically connected between the metal work piece 12 and the electrode 14 and establishes an electrical potential difference between the electrode and the work piece. Device 10 further comprises a tool 18, in this example a nozzle 20 that directs a gas jet 22 into contact with work piece 12. The tool could also comprise a cutting head 24. Tool 18 is movable into contact with the work piece 12 to shape it during operation of device 10. Tool 18 is electrically insulated so that no current is conducted to ground through it when the electrical potential is established between the electrode 14 and the work piece 12. In a practical example, device 10 will also include a base on which the work piece 12 may be fixedly mounted, as well as actuators for moving the electrode 14 and the tool 18 in relation to the work piece 12. These elements are well understood and not shown for clarity.

Figure 1B:
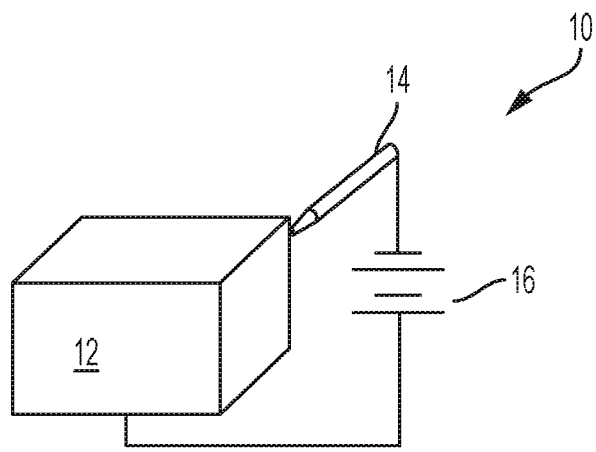
FIG. 1B is a schematic representation of an example embodiment of a device for machining an electrically conducting work piece according to the invention.
Figure 1C:
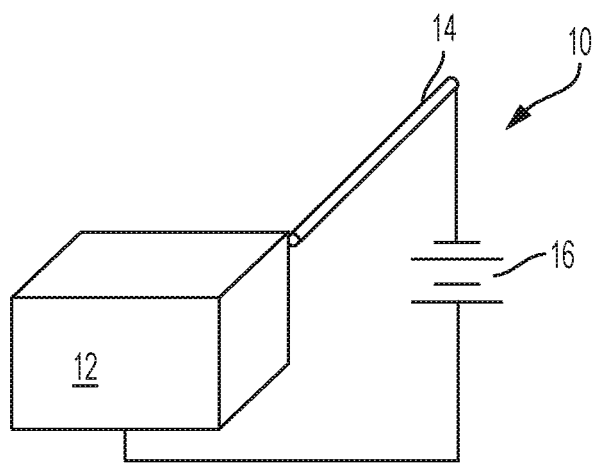
FIG. 1C is a schematic representation of an example embodiment of a device for machining an electrically conducting work piece according to the invention.
Figure 1D:
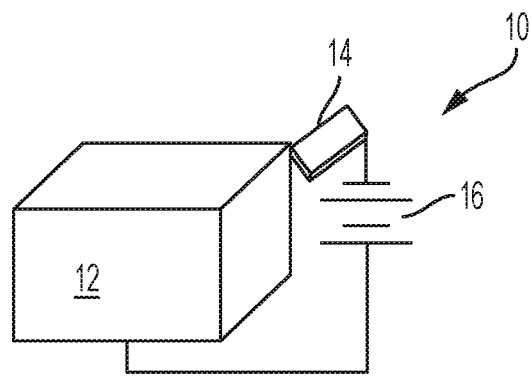
FIG. 1D is a schematic representation of an example embodiment of a device for machining an electrically conducting work piece according to the invention.
Figure 3:
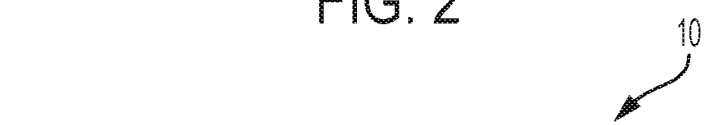
FIG. 3 is a schematic representation of an example embodiment of a device for machining an electrically conducting work piece performed on a lathe according to the invention.
Figure 4:
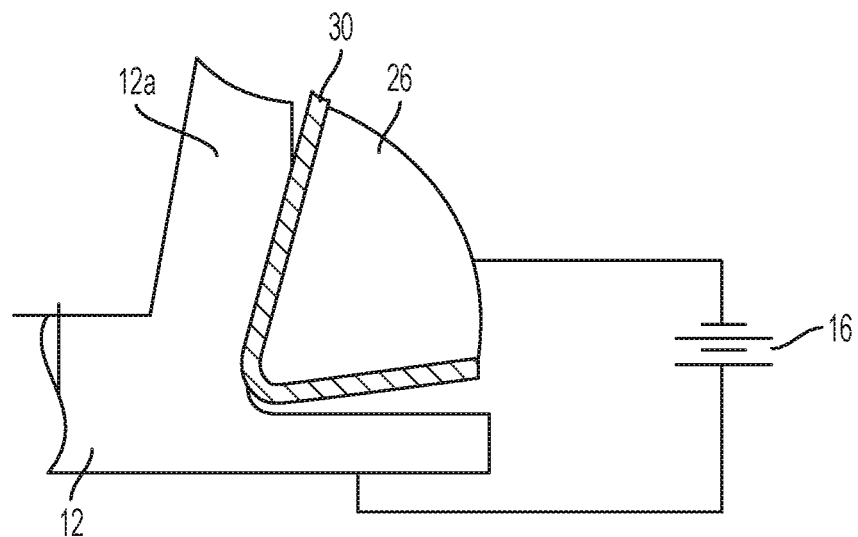
FIG. 4 is a schematic representation of a detail of the example embodiment shown in FIG. 3.

Electrode 14 may have a particular shape suited to the shape of the work piece 12, or advantageous for shaping the work piece in a desired manner. To that end the electrode 14 may comprise a needle (FIG. 1A), a bar (FIG. 2), a cone (FIG. 1B), a cylinder (FIG. 1C), a plate (FIG. 1D), combinations of these shapes or other shapes as needed. Needle shaped electrodes as shown in FIG. 1A are expected to be especially useful in nano-manufacturing. As shown in FIGS. 3 and 4, the function of the electrode and tool can be combined in one electrode-tool 26, wherein the voltage source 16 is electrically connected to the electrode-tool to establish the potential difference between it and the work piece 12.

Device 10 may further comprise a dielectric material 28 positioned between electrode 14 and the work piece 12. The dielectric material 28 may comprise, for example a solid insulating layer or a liquid insulating layer and is used to prevent arcing between the electrode 14 and the work piece 12 when the electrical potential is established. As shown in FIG. 4, the dielectric material 28 may also comprise a coating 30 on the electrode-tool 26. Coating 30 may comprise, for example, a non-conducting ceramic.

Operation of device 10 is described with reference to FIG. 1A. Voltage source 16, connected between the needle-shaped electrode 14 and the metal work piece 12, establishes an electrical potential difference having an electrical field which encompasses a part of the work piece 12 proximate to the electrode 14. It is expected that the field of the electrical potential difference will repel electrons in the outer shell orbitals of atoms in the work piece 12 proximate to the electrode 14. In this region proximate to the electrode 14 it is expected that the atoms will become positively charged ions which will naturally repel one another via Columbic forces. This effect is expected to weaken the bonds between the atoms of the work piece 12 and allow portions of the work piece so affected to be removed by the tool 18 as it contacts the work piece 12 proximate to the electrode 14. It is thought that potential differences in the kilovolt to megavolt range will be effective and greatly reduce the force and energy that need to be applied between the tool 18 and the work piece 12 to shape the work piece by removing material therefrom. It is contemplated that the electrical potential difference can range from about 10 kilovolts to about 100 megavolts, about 10 kilovolts to about 100 kilovolts, and about 10 megavolts to about 100 megavolts.

Figure 2:
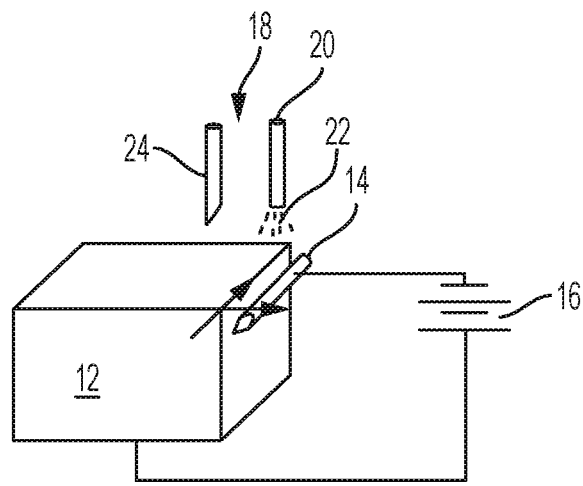
FIG. 2 is a schematic representation of an example embodiment of a device for machining an electrically conducting work piece according to the invention.

FIG. 2 shows a further example of device 10 in operation wherein a bar-shaped electrode 14 is positioned proximate to work piece 12. When the electrical potential is applied by the voltage source 16, bar electrode 14 establishes an electrical field lengthwise along the work piece 12. The field is expected to create a line of positively charged atoms in the work piece 12 which is expected to weaken the region of the work piece proximate to the bar electrode 14 and thus allow tool 18 to remove a length of material along the bar electrode as it traverses the work piece. The force between the tool 18 and the work piece 12 is expected to be greatly reduced as compared with traditional, prior art machining techniques.

FIGS. 3 and 4 illustrate operation of device 10 using an electrode-tool 26. As shown in FIG. 3 a lathe 32 holds an insulated work piece 12. The lathe 32 rotates the work piece 12 about its axis of rotation 34. The voltage source 16 is connected between the work piece 12 and the electrode-tool 26 to establish an electrical field in the work piece 12 proximate to the tool. As shown in FIG. 4, a dielectric coating 30 is positioned on the electrode-tool 26 to prevent arcing between the tool and the work piece. It is expected that the field established by the electrical potential difference between the electrode-tool 26 and the work piece 12 will repel electrons in the work piece and weaken the bonds between the atoms permitting the electrode-tool 26 to separate material 12a from the work piece 12 proximate to the tool.

Figure 5:
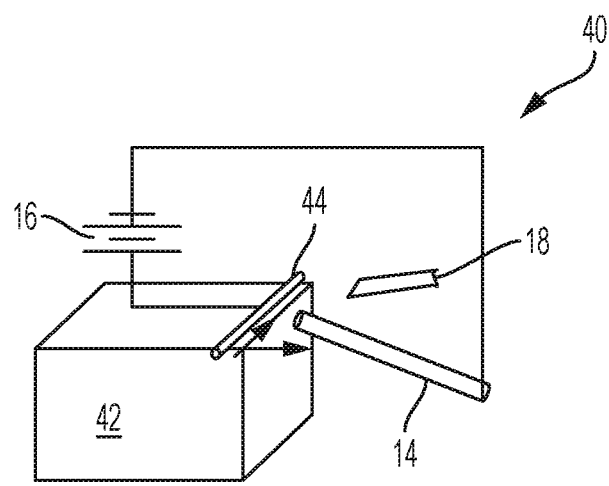
FIG. 5 is a schematic representation of an example embodiment of a device for machining a non-conducting work piece according to the invention.

FIG. 5 schematically illustrates an example device 40 for machining a non-conducting work piece 42. Such work pieces may include, for example fiber-reinforced ceramic-matrix composites (CMCs), oxide-oxide CMCs, ultra-high temperature ceramics and organic matrix composites. Device 40 comprises an electrode 14 and a voltage source 16 as described above, and also includes an electrically conducting member 44. Conducting member 44 may comprise, for example, a metal bar. In device 40 the voltage source 16 is connected between the conducting member 44 and the electrode 14 and both the conducting member and the electrode are positioned proximate to a portion of the non-conducting work piece 42 to be machined. Once the voltage is applied, an electrical field is established which encompasses a portion of the non-conducting work piece 40. It is expected that the field will repel electrons in the work piece between the electrode 14 and the conducting member 44, creating a weakened region of positively charged ions in the work piece 42 that experience repulsion between them. Application of a tool 18 to this weakened region is expected to permit separation of material from the work piece 40 using lower force and less energy than traditional machining techniques.

Figure 6:
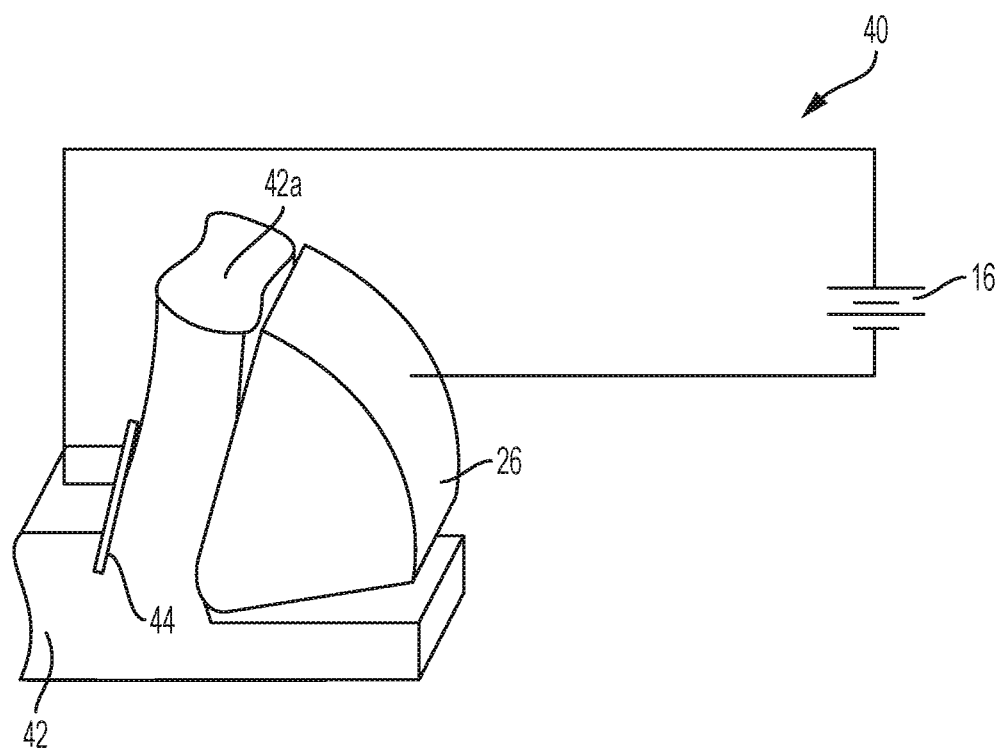
FIG. 6 is a schematic representation of an example embodiment of a device for machining a non-conducting work piece in operation according to the invention.

FIG. 6 shows an example device 40 using an electrode-tool 26 to both establish the electrical field in the work piece 42 (in conjunction with the conducting member 44) and separate material from the work piece. It is expected that when the field is established by the voltage source 16 electrons will be repelled from the work piece 42 in the region between the electrode-tool 26 and the conducting member 44, allowing the electrode-tool to be applied to the work piece 42 and remove material 42a therefrom with much lower force and energy than traditional machining techniques.

Devices according to the invention are expected to permit machining of materials using much less force and energy than traditional machining techniques. The application of the devices and methods according to the invention are expected to be especially advantageous when used on materials that are difficult to machine using the traditional methods and machines.

What is claimed is:

1. A device for machining an electrically conducting work piece, said device comprising:
    an electrode positionable proximate to said work piece;
    a voltage source electrically connected between said electrode and said work piece, said voltage source establishing an electrical potential difference between said electrode and said work piece sufficient to repel electrons in outer shell orbitals of atoms in a portion of said work piece proximate to said electrode;
    a tool movable into contact with said portion of said work piece to separate said portion from said work piece; wherein the electrical potential difference ranges from 10 kilovolts to 100 megavolts.

2. The device according to claim 1, wherein said tool comprises a gas jet impinging on said work piece.

3. The device according to claim 1, wherein said electrode and said tool are movable relatively to said work piece.

4. The device according to claim 1, wherein said electrode comprises a needle.

5. The device according to claim 1, wherein said electrode is selected from the group consisting of a bar, a cone, a cylinder, a plate and combinations thereof.

6. The device according to claim 1, further comprising a dielectric material positioned between said electrode and said work piece.

7. The device according to claim 1, wherein said electrode comprises said tool, said electrode having a layer of dielectric material thereon.

8. A method for machining an electrically conducting work piece, said method comprising:
    positioning an electrode proximate to said workpiece;
    establishing an electrical potential difference between said electrode and said work piece sufficient to repel electrons in outer shell orbitals of atoms in a portion of said work piece proximate to said electrode;
    separating said portion from said work piece; wherein the electrical potential difference ranges from 10 kilovolts to 100 megavolts.

9. A device for machining a non-conducting work piece, said device comprising:
    an electrode positionable proximate to said work piece;
    an electrically conducting member positionable proximate to said work piece;
    a voltage source electrically connected between said electrode and said electrically conducting member, said voltage source establishing an electrical potential difference between said electrode and said electrically conducting member sufficient to repel electrons in outer shell orbitals of atoms in a portion of said work piece between said electrically conducting member and said electrode;
    a tool movable into contact with said portion of said work piece to separate said portion from said work piece; wherein the electrical potential difference ranges from 10 kilovolts to 100 megavolts.

10. The device according to claim 9, wherein said tool comprises a gas jet impinging on said work piece.

11. The device according to claim 9, wherein said electrode and said tool are movable relatively to said work piece.

12. The device according to claim 9, wherein said electrode comprises a needle.

13. The device according to claim 9, wherein said electrode is selected from the group consisting of a bar, a cone, a cylinder, a plate and combinations thereof.

14. The device according to claim 9, further comprising a dielectric material positioned between said electrode and said work piece.

15. The device according to claim 9, wherein said electrode comprises said tool, said electrode having a layer of dielectric material thereon.

16. The device according to claim 1, wherein the electrical potential difference ranges from 10 kilovolts to 100 kilovolts.

17. The device according to claim 1, wherein the electrical potential difference ranges from 10 megavolts to 100 megavolts.

18. The device according to claim 8, wherein the electrical potential difference ranges from 10 kilovolts to 100 kilovolts.

19. The device according to claim 8, wherein the electrical potential difference ranges from 10 megavolts to 100 megavolts.

20. The device according to claim 9, wherein the electrical potential difference ranges from 10 kilovolts to 100 kilovolts.

21. The device according to claim 9, wherein the electrical potential difference ranges from 10 megavolts to 100 megavolts.

* * * * *